(12) United States Patent
Mastroianni et al.

(10) Patent No.: US 11,662,007 B2
(45) Date of Patent: May 30, 2023

(54) PASSIVE FULLY LOCKING MECHANICAL INTER-AXLE DIFFERENTIAL ASSEMBLY

(71) Applicant: Dana Heavy Vehicle Systems Group, LLC, Maumee, OH (US)

(72) Inventors: Steven Mastroianni, Perrysburg, OH (US); Aaron D. Gries, Perrysburg, OH (US); Martin D. Fairchild, Tekonsha, MI (US)

(73) Assignee: Dana Heavy Vehicle Systems Group, LLC, Maumee, OH (US)

( * ) Notice: Subject to any disclaimer, the term of this patent is extended or adjusted under 35 U.S.C. 154(b) by 213 days.

(21) Appl. No.: 17/137,766

(22) Filed: Dec. 30, 2020

(65) Prior Publication Data

US 2022/0205521 A1 Jun. 30, 2022

(51) Int. Cl.

| | |
|---|---|
| *F16H 48/05* | (2012.01) |
| *F16H 48/24* | (2006.01) |
| *B60K 17/02* | (2006.01) |
| *B60K 17/16* | (2006.01) |
| *B60K 17/22* | (2006.01) |
| *B60K 17/35* | (2006.01) |

(Continued)

(52) U.S. Cl.
CPC .............. *F16H 48/24* (2013.01); *B60K 17/02* (2013.01); *B60K 17/16* (2013.01); *B60K 17/22* (2013.01); *B60K 17/3505* (2013.01); *F16D 21/00* (2013.01); *F16D 23/12* (2013.01); *F16H 48/05* (2013.01); *F16H 48/08* (2013.01); *B60K 2023/046* (2013.01); *F16D 7/00* (2013.01); *F16D 2023/123* (2013.01)

(58) Field of Classification Search
CPC .......... F16H 48/24; F16H 48/05; F16H 48/08; B60K 17/02; B60K 17/16; B60K 17/22; B60K 17/3505; B60K 2023/046; B60K 17/344; B60K 17/34; B60K 17/346; F16D 21/00; F16D 23/12; F16D 7/00; F16D 2023/123
See application file for complete search history.

(56) References Cited

U.S. PATENT DOCUMENTS 3,916,728 A * 11/1975 Behar ..................... F16H 48/24
475/231
6,319,166 B1 11/2001 Kyle
(Continued)

FOREIGN PATENT DOCUMENTS

CN 1309976 C * 4/2007 ......... F16H 57/0447

*Primary Examiner* — Justin Holmes
(74) *Attorney, Agent, or Firm* — Marshall & Melhorn, LLC

(57) ABSTRACT

A power divider unit including an input shaft, a drive gear disposed around the input shaft, an inter-axle differential assembly coupled to the input shaft, an output side gear coupled to the input shaft, and a locking system for the power divider unit. The locking system is configured to passively lock the inter-axle differential assembly. The locking system includes a ramped first clutch member in selective engagement with the drive gear, a mating second clutch member configured to engage the first clutch member, a clutch pinion, and a slip clutch assembly. The second clutch member and the first clutch member rotate at different speeds, the clutch pinion rotates and causes the slip clutch assembly and second clutch member to rotate at a speed of the input shaft, causing the first clutch member to mate with the first clutch member.

19 Claims, 5 Drawing Sheets

(51) Int. Cl.
  *F16D 21/00* (2006.01)
  *F16D 23/12* (2006.01)
  *F16H 48/08* (2006.01)
  B60K 23/04 (2006.01)
  F16D 7/00 (2006.01)

(56) References Cited

U.S. PATENT DOCUMENTS

| | | |
|---|---|---|
| 7,152,720 B2 | 12/2006 | Claussen |
| 7,211,017 B2 | 5/2007 | Michael |
| 7,438,661 B2 | 10/2008 | Kyle |
| 7,713,158 B2 * | 5/2010 | Gassmann ........... B60K 17/346 |
| | | 475/213 |
| 8,167,763 B2 | 5/2012 | Curtis |
| 9,400,044 B2 | 7/2016 | Wadhva |
| 9,803,737 B2 | 10/2017 | Knapke |
| 10,156,289 B2 | 12/2018 | De Stefani |

* cited by examiner

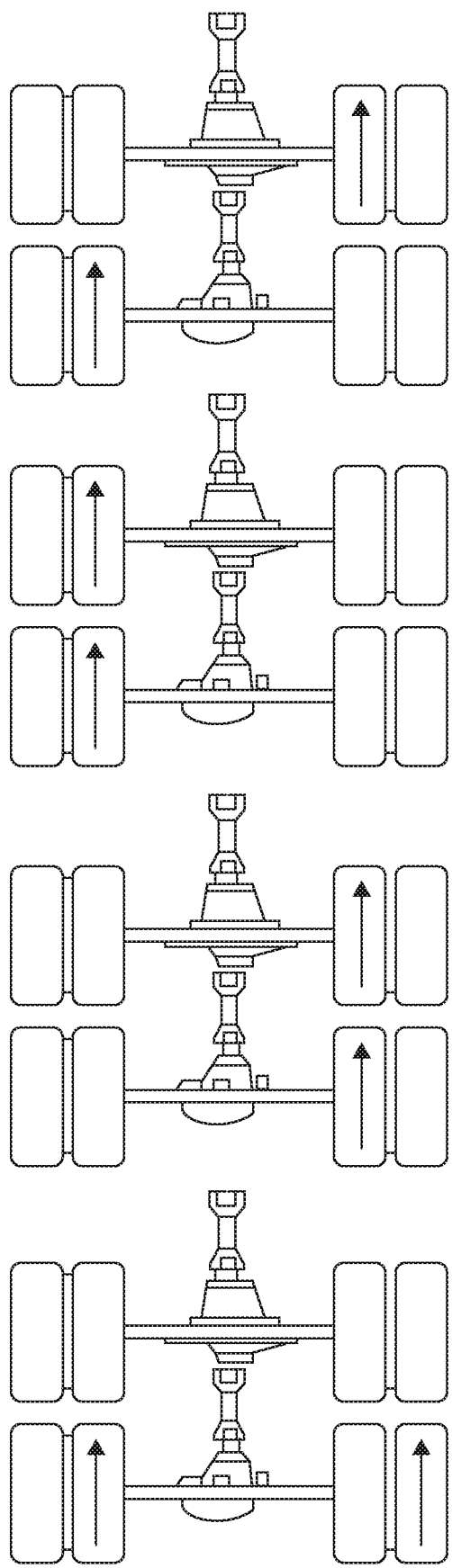

PASSIVE FULLY LOCKING MECHANICAL INTER-AXLE DIFFERENTIAL ASSEMBLY

FIELD

The presently disclosed subject matter relates to an inter-axle differential assembly, and more particularly to a passive fully locking mechanical inter-axle differential assembly.

BACKGROUND

Tandem and tridem axle assemblies are widely used on trucks and other load-carrying vehicles. Such axle assemblies typically comprise at least one forward axle assembly and at least one rear axle assembly. Typically more than one of the axle assemblies are driven, however, in some cases only one axle assembly is driven. The axle assembly may be designated a 6×4 with three axle assemblies, two of which are driven; a 6×6 with three axles assemblies, all driven; a 8×6 with four axle assemblies, three of the rear axle assemblies driven and the front axle assembly for steering; or a 8×8 with four axle assemblies, all driven.

The forward and rear axle assemblies each include a pair of axle half shafts extending therefrom on which one or more wheels of a vehicle are mounted. The axle half shafts in each axle assembly are driven by a wheel differential. The wheel differential includes a pinion gear in mesh with a ring gear (which in turn drives a plurality of bevel gears to cause rotation of the axle half shafts).

Tandem and tridem axle assemblies commonly employ an inter-axle differential assembly to divide power between the forward and rear axle assemblies. The inter-axle differential assembly enables speed differences between the drive axle assemblies, e.g., to allow torque balance between the drive axle assemblies during the vehicle cornering, to compensate for tire size differences, etc.

The inter-axle differential assembly is generally housed within the forward axle assembly. The inter-axle differential assembly for a conventional tandem axle assembly typically includes an input shaft extending into a housing of the forward axle assembly and a spider (or cross-member) mounted on the input shaft and supporting a plurality of bevel pinion gears. The inter-axle differential further includes a pair of side gears in mesh with, and driven by, the pinion bevel gears. One side gear is used to drive the pinion gear of the forward axle assembly wheel differential. The other side gear is coupled to an output shaft that extends outwardly from the forward axle assembly housing and drives the intermediate drive shaft assembly and, indirectly, the pinion gear of the rear axle assembly wheel differential.

At times, it may be necessary to lock the inter-axle differential assembly. For example, during certain driving conditions it may be necessary to prevent power from being delivered to a wheel that has lost traction. In conventional inter-axle differential assemblies, a locking system includes clutch member disposed about the input shaft and can be shifted into engagement with a second clutch member typically defined by one of the side gears to lock the inter-axle differential. Shifting of the clutch member is typically accomplished using a shift fork that is received within the clutch member and is moved through mechanical or electronic actuation. In particular, a piston may urge a pushrod against the shift fork.

Conventional locking systems for inter-axle differential assemblies, however, have several drawbacks. One such drawback is that the locking system requires activation by an operator of the vehicle, e.g., via a button on an instrument panel that activates either a pneumatic or electronic system to lock or unlock the inter-axle differential assembly. In some instances, the operator of the vehicle does not activate the locking system for the inter-axle differential assembly at the appropriate time, thereby causing vehicle degradation and damage thereto.

In view of the above, it would be desirable to produce an inter-axle differential assembly including a passive, mechanical locking system that will automatically lock and unlock the inter-axle differential assembly during certain predetermined operating conditions.

SUMMARY

In concordance and agreement with the present disclosure, an inter-axle differential assembly including a passive, mechanical locking system that will automatically lock and unlock the inter-axle differential assembly during certain predetermined operating conditions, has surprisingly been discovered. In one embodiment, a power divider unit of a vehicle, comprises: an input shaft; a drive gear disposed about the input shaft; an inter-axle differential assembly coupled to the input shaft; and a locking system configured to selectively lock the inter-axle differential assembly, the locking system including a first clutch member, a second clutch member, and a slip clutch assembly configured to selectively engage the second clutch member.

As aspects of certain embodiments, the drive gear freely rotates about the input shaft.

As aspects of certain embodiments, the first clutch member includes at least one of an outer gear and a cam ramp formed thereon.

As aspects of certain embodiments, the locking system further includes a cam ramp member disposed between the drive gear and the first clutch member.

As aspects of certain embodiments, the cam ramp is in splined engagement with the drive gear.

As aspects of certain embodiments, the locking system is locked when a slip condition occurs between a front axle assembly and a rear axle assembly of the vehicle.

As aspects of certain embodiments, the locking system is configured to be passively locked without an intervening action of an operator of the vehicle.

As aspects of certain embodiments, the locking system is unlocked when at least one of a slip condition between a front axle assembly and a rear axle assembly ceases and a predetermined operating condition of the vehicle is reached.

As aspects of certain embodiments, the predetermined operating condition of the vehicle is a speed of the vehicle exceeds a predetermined threshold.

As aspects of certain embodiments, an engagement of the first clutch member and the second clutch member causes the inter-axle differential assembly to rotate with the input shaft.

As aspects of certain embodiments, the slip clutch assembly includes a housing having at least one washer and at least one biasing element disposed therein.

As aspects of certain embodiments, the locking system further includes a clutch ring member.

As aspects of certain embodiments, the clutch ring member is configured to selectively engage the second clutch member.

As aspects of certain embodiments, a housing of the slip clutch assembly is configured to selectively engage the clutch ring member.

As aspects of certain embodiments, a clutch pinion causes the first clutch member to rotate about the input shaft and an increasing gear coupled to the clutch pinion causes a housing of the slip clutch assembly to rotate about the input shaft faster than the first clutch member.

As aspects of certain embodiments, the inter-axle differential assembly includes a spider in splined engagement with the input shaft and at least one pinion gear disposed on the spider.

As aspects of certain embodiments, the locking system is configured to cause the second clutch member to rotate faster than the first clutch member until engagement between the first clutch member and the second clutch member.

As aspects of certain embodiments, the locking system is disposed between the drive gear and a power source.

In another embodiment, a power divider unit of a vehicle, comprises: an input shaft; a drive gear disposed about the input shaft; an inter-axle differential assembly coupled to the input shaft; and a locking system configured to selectively lock the inter-axle differential assembly during a slip condition of the vehicle, the locking system including a first clutch member, a second clutch member, and a slip clutch assembly configured to cause the second clutch member to selectively engage the first clutch member, wherein the slip clutch assembly includes a housing having an outer gear formed thereon and is configured to engage a clutch ring member.

In yet another embodiment, a power divider unit of a vehicle, comprises: an input shaft; a drive gear disposed about the input shaft; an inter-axle differential assembly coupled to the input shaft; and a locking system configured to passively lock the inter-axle differential assembly, the locking system including a first clutch member configured to selectively engage the drive gear, a second clutch member configured to selectively engage the first clutch member, a slip clutch assembly configured to selectively engage the second clutch member, and a clutch pinion configured to cause at least one of the slip clutch assembly and the second clutch member to rotate at a speed of the input shaft and the second clutch member to engage the first clutch member.

BRIEF DESCRIPTION OF THE DRAWINGS

The accompanying drawings are incorporated herein as part of the specification. The drawings described herein illustrate embodiments of the presently disclosed subject matter, and are illustrative of selected principles and teachings of the present disclosure. However, the drawings do not illustrate all possible implementations of the presently disclosed subject matter, and are not intended to limit the scope of the present disclosure in any way.

FIGS. 5A-5D are schematic views of operating conditions of the vehicle in which the locking system of the inter-axle differential assembly is engaged, wherein wheel slippage is indicated by an arrow.

DETAILED DESCRIPTION

Figure 1:
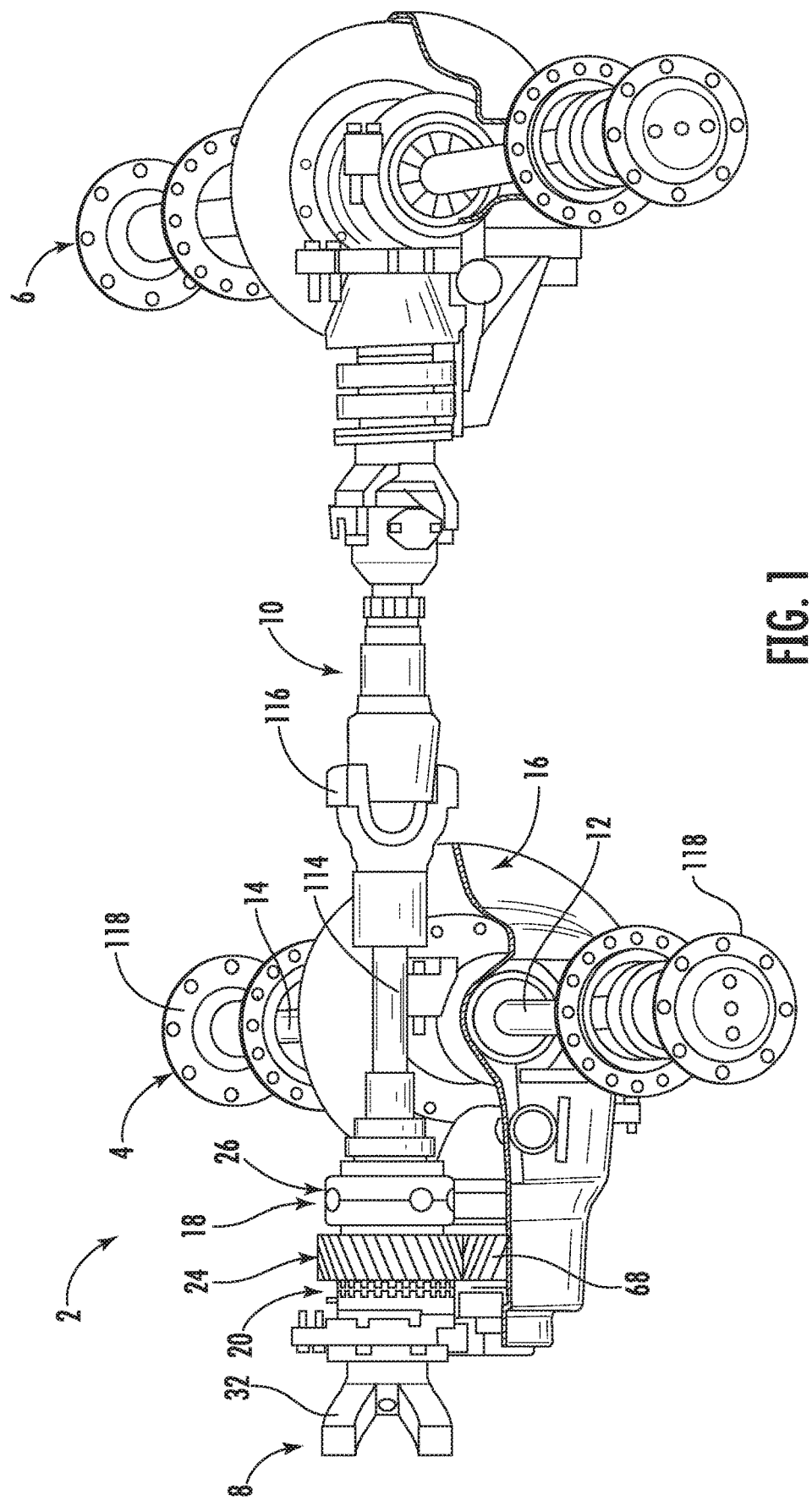
FIG. 1 is a partial fragmentary perspective view of a tandem axle assembly for a vehicle including a front axle assembly and a rear axle assembly, wherein the front axle assembly includes a power divider unit having a locking system for an inter-axle differential assembly according to an embodiment of the presently described subject matter.

It is to be understood that the presently disclosed subject matter may assume various alternative orientations and step sequences, except where expressly specified to the contrary. It is also to be understood that the specific assemblies and systems illustrated in the attached drawings, and described in the following specification are simply exemplary embodiments of the inventive concepts defined herein. Hence, specific dimensions, directions or other physical characteristics relating to the embodiments disclosed are not to be considered as limiting, unless expressly stated otherwise. Also, although they may not be, like elements in various embodiments described herein may be commonly referred to with like reference numerals within this section of the application.

FIG. 1 illustrates an axle assembly 2 for a vehicle (not depicted) including a first axle assembly 4 and a second axle assembly 6. The axle assembly 2 may be used in any suitable vehicle as desired such as a commercial or agricultural truck, equipment, or vessel, for example. The axle assemblies 4, 6 may be provided in a tandem or tridem axle configuration. The first axle assembly 4 may be first in the series and referred to as a front axle assembly, and the second axle assembly 6 may be second in the series and referred to as a rear axle assembly. In certain embodiments, the axle assembly 2 is utilized in a vehicle drivetrain that may provide torque generated by a power source, e.g. an engine or motor, to at least one of the axle assemblies 4, 6 in order to propel the vehicle. The power source may be operatively coupled to an input of a transmission and an output of the transmission may be coupled to an input 8 of the axle assembly 2, such as with a drive shaft (not depicted). An output of the first axle assembly 4 may be selectively coupled to an input of the second axle assembly 6, such as with a prop shaft 10.

In certain embodiments, the first axle assembly 4 is provided to drive wheels (not depicted) supported on axle half shafts 12, 14 extending outwardly from opposite sides of the first axle assembly 4. The first axle assembly 4 may include a housing assembly 16. Referring to FIG. 1, the housing assembly 16 may receive various components of the first axle assembly 4. In addition, the housing assembly 16 may facilitate mounting of the first axle assembly 4 to the vehicle. In at least one configuration, the housing assembly 16 may include an axle housing configured to receive the axle half shafts 12, 14 therein, and a differential carrier configured to support a differential assembly (not depicted) therein for dividing torque between the axle half shafts 12, 14.

As illustrated, the housing assembly 16 further includes a power divider unit (PDU) 18 having a locking system 20 according to an embodiment of the presently disclosed subject matter disposed therein. The PDU 18 may be configured to divide torque between the first axle assembly 4 and the rear axle assembly 6. It should be appreciated, however, that the second axle assembly 6 may include the PDU 18, if desired. As more clearly shown in FIGS. 2 and 4, the PDU 4 includes an input shaft 22, a drive gear 24 (e.g. a helical side gear), an inter-axle differential assembly 26, and an output side gear 28. The locking system 20 shown in FIG. 4 includes a cam ramp member 71, a first clutch member 72 formed with a cam ramp 73, a biasing element 74 (e.g. a wave spring), a retaining element 75 (e.g. a snap ring), a second clutch member 76, a clutch ring member 77, and a slip clutch assembly 78 as will be discussed in further detail hereinafter.

An input coupling 32, e.g. a pinion yoke, shown in FIG. 1, may facilitate coupling of the first axle assembly 4 to the power source. For example, the input coupling 32 may be operatively connected to the drive shaft. In some embodiments, the input coupling 32 may be disposed on the input shaft 22 and may be at least partially disposed outside the differential carrier. The input coupling 32 may be fixedly positioned with respect to the input shaft 22. For example, the input coupling 32 may have a hole that may receive the input shaft 22 and a set of splines that may mate with corresponding splines 34 on the input shaft 22 to limit or inhibit rotation of the input coupling 32 about the first axis A-A with respect to the input shaft 22. In addition, a fastener (not depicted), such as a nut, may be disposed on the input shaft 22 to militate against an axial movement of the input coupling 32 along the first axis A-A with respect to the input shaft 22.

Figure 2:
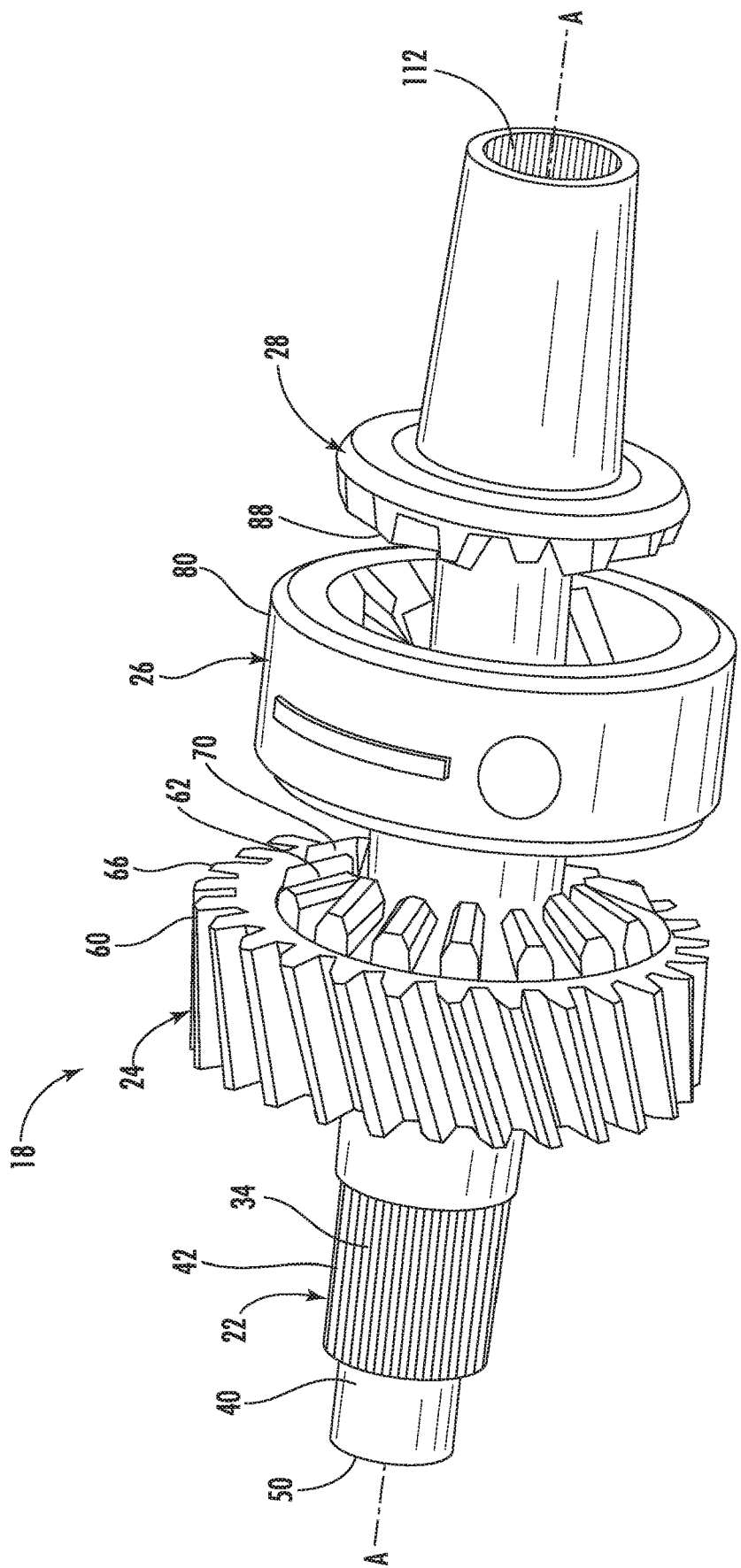
FIG. 2 is a perspective view of the power divider unit shown in FIG. 1.
Figure 4:
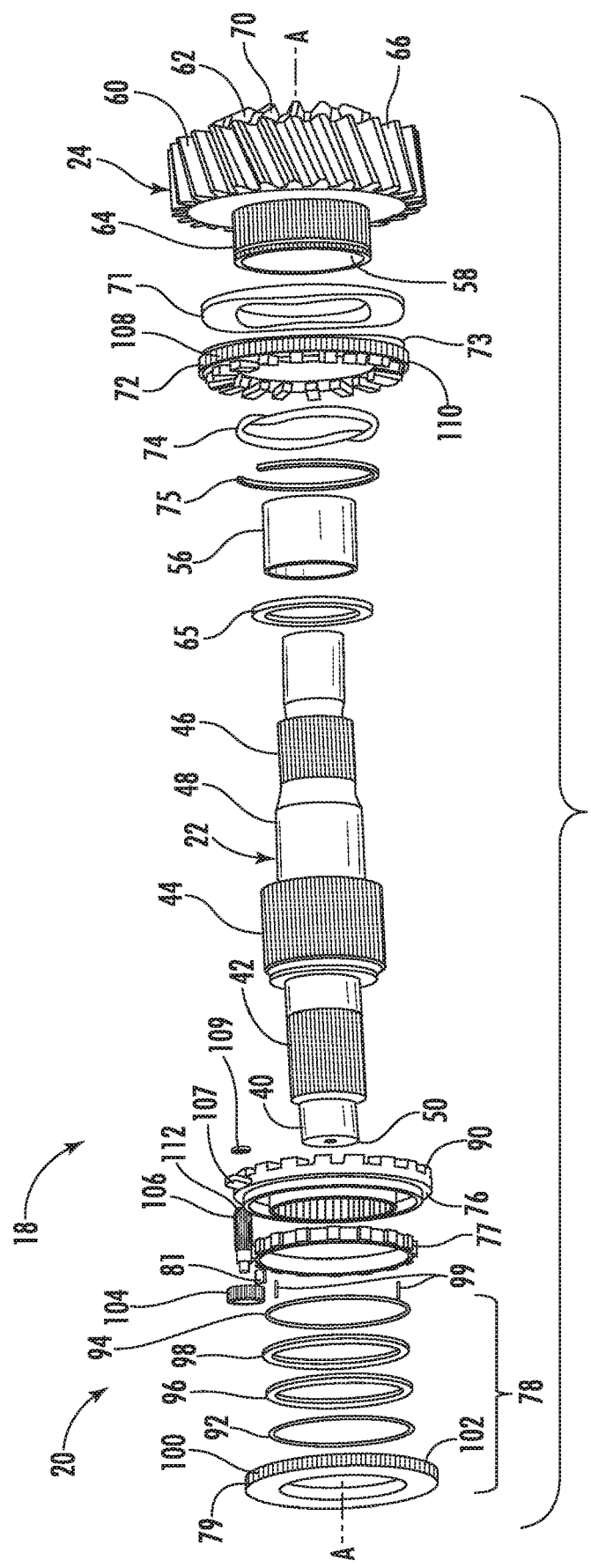
FIG. 4 is an exploded perspective view of a portion of the power divided unit shown in FIGS. 1 and 2.

Referring to FIGS. 2 and 4, the input shaft 22 may extend along and may be configured to rotate about the first axis A-A. For example, the input shaft 22 may be rotatably supported by one or more roller bearing assemblies (not depicted) that may be disposed on the housing assembly 16. As illustrated in FIG. 4, the input shaft 22 may have a retaining portion 40, a first receiving portion 42, a second receiving portion 44, a third receiving portion 46, and at least one friction-reducing element support surface 48. The retaining portion 40 may be disposed proximate a first end 50 of the input shaft 22. In some embodiments, the retaining portion 40 may include one or more threads (not depicted) that may extend around the first axis A-A. The threads of the retaining portion 40 may facilitate mounting of the fastener that militates against the axial movement of the input coupling 32. The first receiving portion 42 may be axially positioned along the first axis A-A between the retaining portion 40 and the second receiving portion 44. The first receiving portion 42 may have a plurality of splines that may be arranged around an outer circumferential surface of the input shaft 22. For example, the splines may be disposed substantially parallel to the first axis A-A and may extend radially outwardly from the input shaft 22. The splines of the first receiving portion 42 may mate with corresponding splines formed on an inner surface of the input coupling 32 to militate against or limit rotation of the input coupling 32 with respect to the input shaft 22.

The second receiving portion 44 may be axially positioned along the first axis A-A between the first receiving portion 40 and the support surface 48. The second receiving portion 44 may have a plurality of splines that may be arranged around the outer circumferential surface of the input shaft 22. For example, the splines may be disposed substantially parallel to the first axis A-A and may extend radially outwardly from the input shaft 22. Moreover, the second receiving portion 44 may be disposed to extend radially outwardly further from the input shaft 22 than the first receiving portion 42 and the third receiving portion 46 in one or more embodiments. The splines of the second receiving portion 44 may mate with corresponding splines formed on an inner surface of the second clutch member 76, shown in FIG. 4, of the locking system 20 to militate against or limit rotation of the second clutch member 76 with respect to the input shaft 22.

In certain embodiments, the second clutch member 76 includes a plurality of teeth 90 that may be arranged around the first axis A-A on the first face of the second clutch member 76 that may extend axially outward toward the first clutch member 72. The clutch ring member 77 and the slip clutch assembly 78 are also disposed on the second receiving portion 44. The clutch ring member 77 is configured to selectively lock to the second clutch member 76. A clutch key 81 may be disposed between the clutch ring member 77 and the second clutch member 76 so that, when the clutch key 81 is in an engaged position, the clutch ring member 77 is coupled to the second clutch member 76 for rotation therewith, and when the clutch key 81 is in a disengaged position, the clutch ring member 77 is decoupled from the second clutch member 76. In certain embodiments, the clutch key 81 is configured to move from the engaged position to the disengaged position at a predetermined operating condition of the vehicle such as a predetermined vehicle speed without occurrence of a slip condition, for example.

The slip clutch assembly 78 may be configured to selectively lock to the clutch ring member 77. In certain embodiments, the slip clutch assembly 78 includes a housing 79 configured to receive a first clutch biasing element 92, a second clutch biasing element 94, a pair of slip clutches 96, 98, and a pair of pins 99 disposed therebetween. As illustrated, the housing 79 includes an outer gear 100. The outer gear 100 may include a plurality of teeth 102 extending radially outward that may engage and may mesh with teeth extending radially outward from an increasing gear 104 drivingly coupled to a clutch pinion 106, shown in FIG. 4. For example, the teeth 102 may be arranged around an outer circumferential surface of the outer gear 100. In certain embodiments, the second clutch member 76 may include a bore 107 formed therein to receive the clutch pinion 106 therethrough. An axial position of the clutch pinion 106 within the bore 107 relative to the second clutch member 76 may be maintained by any suitable method such as use of a retaining element 109, for example.

The third receiving portion 46 may be axially positioned between the support surface 48 and a second end of the input shaft 22. The third receiving portion 46 may have a plurality of splines that may be arranged around the outer circumferential surface of the input shaft 22. For example, the splines may be disposed substantially parallel to the first axis A-A and may extend radially outward from the input shaft 22. The splines of the third receiving portion 46 may mate with corresponding splines formed on an inner surface of a spider 54 of the inter-axle differential assembly 26, shown in FIG. 3, to militate against or limit rotation of the spider 54 with respect to the input shaft 22.

The support surface 48 may be axially positioned between the second receiving portion 44 and the third receiving portion 46. The support surface 48 may rotatably support the drive gear 24 or may support a friction-reducing element 56 disposed on the support surface 48 that may rotatably support the drive gear 24. It is understood that the friction-reducing element 56 may be any suitable type of component as desired such as a bearing or a bushing, for example. Referring to FIGS. 1, 2, and 4, the drive gear 24 may be disposed about the input shaft 26. For example, the drive gear 24 may have a center bore 58 that may receive the friction-reducing element 56 that may be disposed on the support surface 48 of the input shaft 22 and that may rotatably support the drive gear 24. The friction-reducing element 56, if provided, may facilitate rotation of the drive gear 24 around or with respect to the input shaft 22 under certain operating conditions as will be discussed in more detail below.

The drive gear 24 may include an outer gear 60, a side gear 62 formed on a first face of the drive gear 24, and a hub portion 64, shown in FIG. 4, formed on a second face of the drive gear 24. A washer 65 may be interposed between a face of the second receiving portion 44 and the hub portion 64 of the drive gear 24 to minimize friction therebetween and facilitate rotation of the drive gear 24. The outer gear 60 may include a plurality of teeth 66 extending radially outward that may engage and may mesh with teeth extending radially outward from a driven gear 68, shown in FIG. 1. For example, the teeth 66 may be arranged around an outer circumferential surface of the drive gear 24. The side gear 62 may also include a plurality of teeth 70 that may be arranged around the first axis A-A on the first face of the drive gear 24 that may extend axially outward toward the inter-axle differential assembly 26.

As illustrated in FIG. 4, the hub portion 64 may have a plurality of splines that may be arranged around an outer circumferential surface thereof. For example, the splines may be disposed substantially parallel to the first axis A-A and may extend radially outwardly from the hub portion 64. The splines of the hub portion 64 may mate with corresponding splines formed on an inner surface of the cam ramp member 71 of the locking system 20 to militate against or limit rotation of the cam ramp member 71 with respect to the drive gear 24. As shown, the cam ramp member 71 of the locking system 20 may be disposed on the drive gear 24 adjacent a second face of the drive gear 24 opposite the side gear 62.

The first clutch member 72 of the locking system 20 may also be disposed on the hub portion 64. As shown, the first clutch member 72 may include an outer gear 108 may include a plurality of teeth 110 extending radially outward that may engage and may mesh with teeth 112 extending radially outward from the clutch pinion 106, shown in FIG. 4. For example, the teeth 110 may be arranged around an outer circumferential surface of the outer gear 108. In certain embodiments, the first clutch member 72 is disposed adjacent the cam ramp member 71 and configured to rotate freely about the hub portion 64 of the drive gear 24. The biasing element 74 maybe disposed between the first clutch member 72 and the retaining element 75, and configured to urge the first clutch member 72 in an axial direction away from the retaining element 75 and towards the cam ramp member 71 to a fully open position when there is no torque through the locking system 20.

Figure 3:
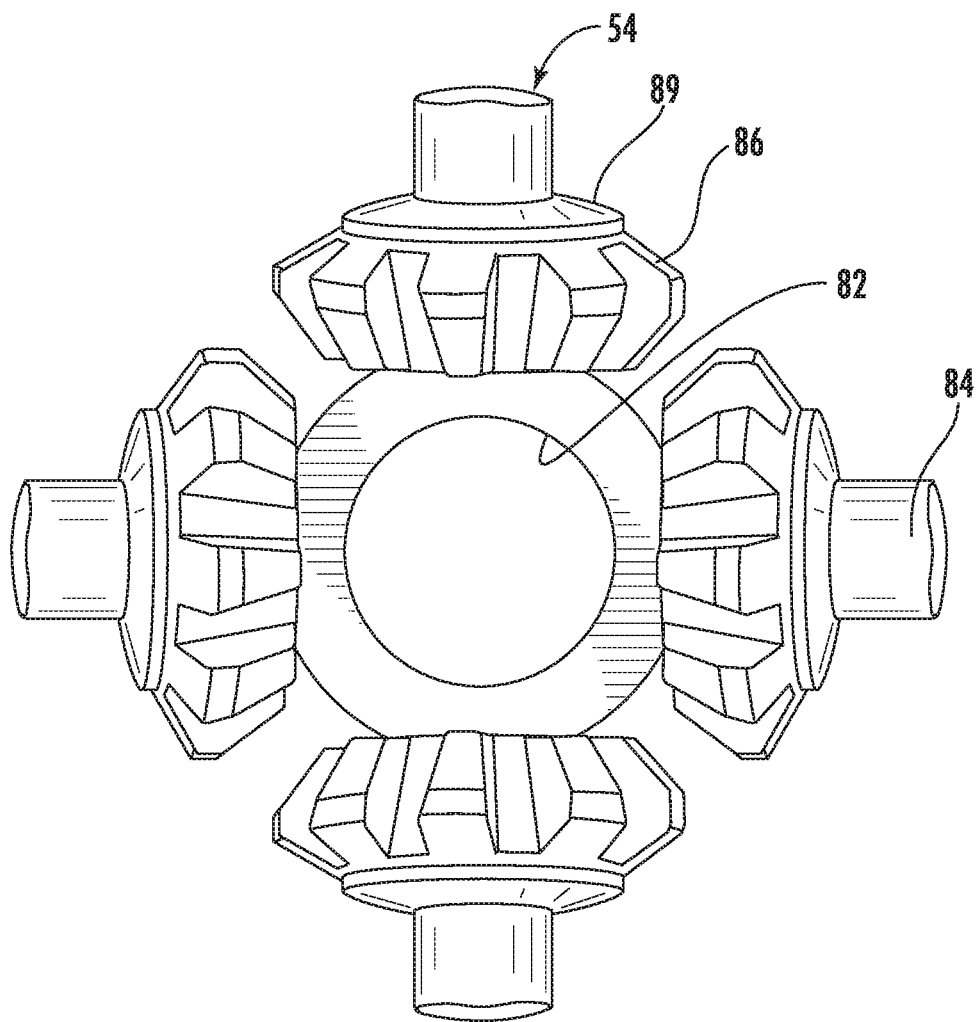
FIG. 3 is a front elevational view of a portion of the inter-axle differential assembly shown in FIGS. 1 and 2, wherein the inter-axle differential includes a spider have a plurality of side pinion gears disposed thereon.

Referring now to FIGS. 2 and 3, the inter-axle differential assembly 26 may compensate for speed differences between the first and second axle assemblies 4, 6, such as speed differences between the first and second axle assemblies 4, 6, when connected in series. As shown, the inter-axle differential assembly 26 may be axially positioned along the first axis A-A between the drive gear 24 and the output side gear 28. It is understood that any suitable inter-axle differential assembly may be employed as desired.

In the embodiment shown, the inter-axle differential assembly 26 may include a case 80, a spider 54 having a center bore 82, an array of radially outwardly extending pins 84, and a plurality of pinion gears 86. The spider 54 may be fixedly positioned with respect to the input shaft 22. For instance, the center bore 82 of the spider 54 may include a plurality of splines that may mate with the third receiving portion 46 of the input shaft 22 to limit or militate against rotation of the spider 54 with respect to the input shaft 22. As such, the spider 54 may rotate about the first axis A-A with the input shaft 22.

Each pinion gear 86 is rotatably disposed on a corresponding one of the pins 84 of the spider 54. As illustrated in FIG. 2, the case 80 may at least partially receive the spider 54 and the pinion gears 86. In addition, each of the side gear 62 of the drive gear 24 and a side gear 88 of the output side gear 28 may extend into and may be received in the case 80 to cooperate with the pinion gears 86. In certain embodiments, each of the pinion gears 86 may include a plurality of teeth that may mate with a plurality of teeth formed on the side gear 62 of the drive gear 24 and may mate with a plurality of teeth formed on the side gear 88 of the output side gear 28. A washer 89 may be interposed between the case 80 and each of the pinion gears 86 to minimize friction therebetween and facilitate rotation of the pinion gears 86. In certain embodiments, the output side gear 28 may be disposed proximate a second end of the input shaft 22. For example, the output side gear 28 may have a center bore 112 that may receive and support the input shaft 22 so that the output side gear 28 may be rotatable with respect to the input shaft 22. A portion of the center bore 112 may include a plurality of splines that may mate with an output shaft 114, shown in FIG. 1, to limit or militate against rotation of the output side gear 28 with respect to the output shaft 114. As such, the output side gear 28 may rotate about the first axis A-A with the output shaft 114.

The output shaft 114, which may also be referred to as a through shaft, may extend along and may be configured to rotate about the first axis A-A. As such, the output shaft 114 may be coaxially disposed with the input shaft 22. The output shaft 114 may be rotatably supported by one or more roller bearing assemblies (not depicted) that may be disposed on the housing assembly 16. The output shaft 114 may have an output coupling 116 configured to facilitate coupling of the first axle assembly 4 to the second axle assembly 6. For instance, the output coupling 116 may be coupled to a connecting shaft, such as the prop shaft 10.

Referring to FIG. 1, a drive pinion (not depicted) may be spaced apart from the input shaft 22 and may be rotatable about a second axis. In certain embodiments, the second axis is spaced apart from and substantially parallel to the first axis A-A. The drive pinion may extend through the driven gear 68 and may not rotate with respect to the driven gear 68. For example, the drive pinion and the driven gear 68 may have mating splines that inhibit rotation of the drive pinion with respect to the driven gear 68. Accordingly, the drive pinion may rotate with the driven gear 68 about the second axis. The drive pinion may have a gear portion that may be disposed at an end of the drive pinion. The gear portion may include a set of teeth that mate with corresponding teeth on a ring gear of a differential assembly.

The differential assembly may be received in the differential carrier of the housing assembly 16. The differential assembly may transmit torque to the vehicle traction wheel assemblies and permit the traction wheel assemblies to rotate at different velocities in a manner known by those skilled in the art. The ring gear may be fixedly mounted on a case of the differential assembly. The ring gear may have teeth that may mesh with the gear portion of the drive pinion. Rotation of the drive pinion may rotate the ring gear and the differential case about a third axis. The ring gear may be operatively connected to the axle half shafts 12, 14 by the differential assembly. As such, the differential assembly may receive torque via the ring gear and provide torque to the axle half shafts 12, 14.

The axle half shafts may transmit torque from the differential assembly to corresponding traction wheel assemblies. Each axle half shaft 12, 14 may extend through a different arm portion of axle housing 16. The axle half shafts 12, 14 may extend along and may be rotated about the third axis by the differential assembly. Each axle half shaft may have a first end and a second end. The first end may be coupled to the differential assembly. The second end may be disposed opposite the first end and may be operatively connected to a wheel end assembly that may have a wheel hub that may support a wheel. As shown in FIG. 1, at least one axle flange 118 may be disposed proximate the second end of the axle half shafts 12, 14 and may facilitate coupling of the axle half shafts 12, 14 to the wheels.

Operation of the axle assembly 10 will now be described in more detail.

FIGS. 5A-5D illustrate various slip conditions of the front axle assembly-to-rear axle assembly (and vise versa), during which the locking system 20 for the PDU 18 is passively mechanically activated. During such slip conditions, the clutch pinion 106 will rotate causing the increasing gear 104 drivingly coupled to the clutch pinion 106 to rotate therewith. The rotation of the increasing gear 104 causes the clutch housing 79 of the slip clutch assembly 78 to rotate at a faster rate than the first clutch member 72. Because the clutch housing 79 rotates at the faster rate, the slip clutch assembly 78 is caused to engage the clutch ring member 77. Upon engagement of the slip clutch assembly 78 with the clutch ring member 77, the slip clutch assembly 78, the clutch ring member 77, and the second clutch member 76 all rotate at a speed of the input shaft 22. Simultaneously, the first clutch member 72 is also caused to rotate by the clutch pinon 106, thereby engaging the second clutch member 76. The engagement of the clutch members 72, 76 causes the first clutch member 76 to contact a ramp surface of the cam ramp 71 and the input shaft 22 to be locked to the drive gear 24, through the inter-axle differential assembly 26, to the output side gear 28. As such, the input shaft 26 and the output shaft 32 are prevented from rotating at different rotational velocities about the first axis A-A.

When a predetermined operating condition (e.g. a predetermined vehicle speed without an occurrence of a slip condition, the input shaft 22 will rotate at such a rate that a centripetal force causes the clutch key 81 to move from the engaged position to the disengaged position. The disengaged position of the clutch key 81 deactivates and unlocks the locking system 20 of the PDU 18.

When there is no torque being transmitted through the first clutch member 72, the biasing element 74 urges the first clutch member 72 in an axial direction towards the cam ramp 71 from an engaged position with the second clutch member 76 to a disengaged fully open opposition. As such, the inter-axle differential assembly 26 may be unlocked and torque may be transmitted to the drive gear 24 by the inter-axle differential assembly 26. The drive gear 24 may then transmit torque to the differential assembly by way of the driven gear 68, drive pinion, and the ring gear. As such, torque may not be transmitted from the input shaft 22 to the output shaft 28 and to another axle assembly. Moreover, torque that is transmitted to the input shaft 22 may not be transmitted to the drive gear 24 and the differential assembly as the torque may be transmitted through the inter-axle differential unit 26 may cause the drive gear 24 to freely spin about the first axis A-A, which provides less rotational resistance than is provided by the drive gear 24 and downstream components, such as the driven gear 68, drive pinion, differential assembly, and axle half shafts 12, 14.

While various embodiments have been described above, it should be understood that they have been presented by way of example, and not limitation. It will be apparent to persons skilled in the relevant arts that the disclosed subject matter may be embodied in other specific forms without departing from the spirit or essential characteristics thereof. The embodiments described above are therefore to be considered in all respects as illustrative, not restrictive.

What is claimed is:

1. A power divider unit of a vehicle, comprising:
 an input shaft;
 a drive gear disposed about the input shaft;
 an inter-axle differential assembly coupled to the input shaft; and
 a locking system configured to selectively lock the inter-axle differential assembly, the locking system including a first clutch member, a second clutch member, and a slip clutch assembly configured to selectively engage the second clutch member, wherein the locking system further includes a cam ramp member disposed between the drive gear and the first clutch member.

2. The power divider unit of claim 1, wherein the drive gear freely rotates about the input shaft.

3. The power divider unit of claim 1, wherein the first clutch member includes at least one of an outer gear and the cam ramp formed thereon.

4. The power divider unit of claim 3, wherein the cam ramp is in splined engagement with the drive gear.

5. The power divider unit of claim 1, wherein the locking system is locked when a slip condition occurs between a front axle assembly and a rear axle assembly of the vehicle.

6. The power divider unit of claim 1, wherein the locking system is configured to be passively locked without an intervening action of an operator of the vehicle.

7. The power divider unit of claim 1, wherein the locking system is unlocked when at least one of a slip condition between a front axle assembly and a rear axle assembly ceases and a predetermined operating condition of the vehicle is reached.

8. The power divider unit of claim 7, wherein the predetermined operating condition of the vehicle is a speed of the vehicle exceeds a predetermined threshold.

9. The power divider unit of claim 1, wherein an engagement of the first clutch member and the second clutch member causes the inter-axle differential assembly to rotate with the input shaft.

10. The power divider unit of claim 1, wherein the slip clutch assembly includes a housing having at least one washer and at least one biasing element disposed therein.

11. The power divider unit of claim 1, wherein the locking system further includes a clutch ring member.

12. The power divider unit of claim 11, wherein the clutch ring member is configured to selectively engage the second clutch member.

13. The power divider unit of claim 11 wherein a housing of the slip clutch assembly is configured to selectively engage the clutch ring member.

14. The power divider unit of claim 1, wherein a clutch pinion causes the first clutch member to rotate about the input shaft and an increasing gear coupled to the clutch pinion causes a housing of the slip clutch assembly to rotate about the input shaft faster than the first clutch member.

15. The power divider unit of claim 1, wherein the inter-axle differential assembly includes a spider in splined engagement with the input shaft and at least one pinion gear disposed on the spider.

16. The power divider unit of claim 1, wherein the locking system is configured to cause the second clutch member to rotate faster than the first clutch member until engagement between the first clutch member and the second clutch member.

17. The power divider unit of claim 1, wherein the locking system is disposed between the drive gear and a power source.

18. A power divider unit of a vehicle, comprising:
an input shaft;
a drive gear disposed about the input shaft;
an inter-axle differential assembly coupled to the input shaft; and
a locking system configured to selectively lock the inter-axle differential assembly during a slip condition of the vehicle, the locking system including a first clutch member, a second clutch member, and a slip clutch assembly configured to cause the second clutch member to selectively engage the first clutch member, wherein the slip clutch assembly includes a housing having an outer gear formed thereon and is configured to engage a clutch ring member.

19. A power divider unit of a vehicle, comprising:
an input shaft;
a drive gear disposed about the input shaft;
an inter-axle differential assembly coupled to the input shaft; and
a locking system configured to passively lock the inter-axle differential assembly, the locking system including a first clutch member configured to selectively engage the drive gear, a second clutch member configured to selectively engage the first clutch member, a slip clutch assembly configured to selectively engage the second clutch member, wherein the locking system further includes a cam ramp member disposed between the drive gear and the first clutch member and a clutch pinion configured to cause at least one of the slip clutch assembly and the second clutch member to rotate at a speed of the input shaft and the second clutch member to engage the first clutch member.

* * * * *